(12) United States Patent
Fortuna et al.

(10) Patent No.: US 6,738,313 B2
(45) Date of Patent: May 18, 2004

(54) SYSTEM FOR DETECTING DISTANCES USING CHAOTIC SIGNALS

(75) Inventors: Luigi Fortuna, Syracusa (IT); Alessandro Rizzo, Acireale (IT); Mattia Frasca, Catania (IT); Marco Branciforte, Catania (IT); Marco Bartolone, Torregrotta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/325,620

(22) Filed: Dec. 20, 2002

(65) Prior Publication Data

US 2003/0133362 A1 Jul. 17, 2003

(30) Foreign Application Priority Data

Dec. 21, 2001 (EP) .............................. 01830801

(51) Int. Cl.$^7$ .............................................. G01S 7/523
(52) U.S. Cl. ........................................ 367/100; 342/129
(58) Field of Search ............................. 367/100, 101, 367/102; 342/128, 129, 130, 131, 134, 137, 145, 200, 201

(56) References Cited

U.S. PATENT DOCUMENTS

| 5,321,409 A | 6/1994 | Walker ........................ 342/202 |
| 2002/0130810 A1 * | 9/2002 | Gottwald et al. ........... 342/159 |

FOREIGN PATENT DOCUMENTS

| CN | 1335516 | * | 2/2002 | | |
| EP | 1324069 A1 | * | 7/2003 | ............ | G01S/15/10 |
| GB | 2156986 | | 10/1985 | ............ | G01S/15/32 |

OTHER PUBLICATIONS

Everett, Survey of Collision Avoidance and Ranging Sensors for Mobile Robots, Robotics and Autonomous Systems, Elsevier Science Publishers, Amsterdam, vol. 58, No. 1, May 1, 1989, pp. 5–67, XP000113868.

Arena et al., Chua's Circuit Can Be Generated By CNN Cells, IEEE Transactions on Circuits and Systems I: Fundamental Theory and Applications, New York, vol. 42, No. 2, Feb. 1, 1995, pp. 122–125, XP000510186.

Kawabata et al., Distance Measurement Method Under Multiple Ultra Sonic Sensors Environment, Industrial Electronics, Control, and Instrumentation, 1996, Proceedings of the 1996 IEEE IECON 22$^{nd}$ International Conference on Taipei, Taiwan, Aug. 5, 1996–Aug. 10, 1996, pp. 812–816, XP010203479.

(List continued on next page.)

Primary Examiner—Daniel T. Pihulic
(74) Attorney, Agent, or Firm—Lisa K. Jorgenson; Allen, Dyer, Doppelt, Milbrath & Gilchrist, P.A.

(57) ABSTRACT

A system for detecting distances for vehicle and robotic applications includes a transducer for generating a transmission signal to be sent in the direction of an obstacle, and for obtaining a receiving signal corresponding to an echo produced by the reflection of the transmission signal off the obstacle. The transducer is driven by a chaos generator, such as a Chua's circuit. The system also includes a correlator for correlating the transmission signal and the receiving signal so that the distance between the obstacle and the transducer is identified by an instant at which the correlation assumes a high value. The transmission signal may be a square-wave signal selectively generated with one first frequency and one second frequency, and jumps between the two frequencies are determined by the instants of emission of the pulses generated by an analog type pulse generator driven by the chaos generator.

30 Claims, 4 Drawing Sheets

OTHER PUBLICATIONS

Kolumban et al., The Role of Synchronization in Digital Communications Using Chaos—Part I: Fundamentals of Digital Communications, IEEE Transactions on Circuits and Systems I: Fundamental Theory and Applications, IEEE Inc. New York, vol. 44, No. 10, Oct. 1, 1997, pp. 927–936, XP000722574.

Kolumban et al., The Role of Synchronization in Digital Communications Using Chaos—Part II: Chaotic Modulation and Chaotic Synchronization, IEEE Transactions on Circuits and Systems I: Fundamental Theory and Applications, IEEE Inc. New York, vol. 45, No. 11, 11/98, pp. 1129–1139, XP000866877.

Kolumban et al., Role of Synchronization in Digital Communications Using Chaos—Part III: Performance Bounds for Correlation Receivers, IEEE Trans Circuits System I Fundamental Theory Appl., IEEE Transactions on Circuits and Systems I: Fundamental Theory and Applications, Piscataway, NJ, vol. 47, No. 12, 12/00, pp. 1673–1683, XP002199709.

Fortuna et al, Chaos Preservation Through Continuous Chaotic Pulse Position Modulation, ISCAS 2001, The 2001 IEEE International Symposium on Circuits and Systems (Cat. No. 01CH37196), Sydney, Australia, May 6, 2001–May 9, 2001, pp. 803–806, vol. 2, XP002199708.

* cited by examiner

SYSTEM FOR DETECTING DISTANCES USING CHAOTIC SIGNALS

FIELD OF THE INVENTION

The present invention relates to systems for detecting distances, and in particular, to a system for avoiding collisions with obstacles. Such a system is applicable to vehicles, robotics, industrial plants and automated guided vehicles (AGVs), for example.

BACKGROUND OF THE INVENTION

The problem of avoiding collisions in the above mentioned applications is rendered even more complex by the fact that, in the vast majority of cases, operations take place in non-structured environments. Consequently, intelligent control of the vehicles and/or mobile elements involved must plan for anti-collision strategies and sensing systems that are able, for instance, to plan paths that are alternative to the ones defined in the initial control step and/or are able to signal the presence of obstacles, in particular, based upon data coming from different sensors associated with the vehicle/mobile element.

Typically, sensors are used that are able to measure the so-called time of flight (TOF). The time of flight is the time interval that elapses between the transmission of a wave and the reception of the wave reflected after interaction with an obstacle.

Implementation of driving schemes based upon the use of distance sensors that are able to detect and/or measure the time of flight usually make use of algorithms that handle the transmission intervals of the various sensors. For example, robotics and vehicles make use of these driving schemes. The vehicle/mobile element is usually equipped with a number of sensors which act in a number of directions in order to examine the entire surrounding space, or at least, the portion of space of interest for avoiding collisions. The above approach requires a dedicated control unit, such as the one described, for example, in Sensors for Mobile Robots, Theory and Application, by H. R. Everett, A. K. Peters Ltd., Natick, Mass., 1995.

A number of sensors associated with the same vehicle/mobile element may interact together, thus giving rise to situations of interference that may reduce the quality of the measurements. In addition, the use of a number of vehicles/mobile elements operating in a multi-user scenario introduces an additional source of interference.

The algorithms according to the prior art are very difficult to apply to situations in which a number of vehicles/mobile elements are present. In this case, there is an unavoidable need to provide a monitoring and coordinating unit for the entire vehicles/mobile elements involved. This results, in a majority of the applications, in additional costs and in more general terms, a considerable loss in the autonomy of movement of vehicles/elements designed to operate independently from one another.

SUMMARY OF THE INVENTION

In view of the foregoing background, an object of the present invention is to provide a system for detecting distances which can be applied to systems comprising a number of vehicles and/or mobile elements. The system operates in a multi-user scenario, namely, in a context in which each sensor encounters some difficulty in distinguishing its own echo on account of the signals generated simultaneously by the other sensors associated with the same vehicle/mobile element or else with different vehicles/elements.

The system according to the present invention addresses the problem linked to multipath-fading, i.e., where a sensor is not able to distinguish the echo reflected by the obstacle along the shortest path (a path representing the actual distance from the obstacle) from the other echoes that cover longer paths, such as the ones generated by indirect reflections due to walls or other obstacles.

According to the present invention, the above objective is achieved by a system comprising at least one transducer for generating a transmission signal to be sent in a direction of the obstacle, and for obtaining a receiving signal corresponding to an echo produced by a reflection of the transmission signal off the obstacle. The system further comprises a chaos generator for driving the transducer so that the transmission signal has characteristics of a chaotic signal.

In particular, the invention exploits the possibility of using the advantages afforded by chaotic communications in order to address the problems linked to the use of sensors based on the measurement of the time of flight (TOF).

Chaos-based communication schemes exploit the high sensitivity to variations in the initial conditions, and in the values of the system parameters for generating a large variety of codes based upon non-predictable sequences. As is known, chaotic communication schemes may be divided into coherent schemes and non-coherent schemes, according to whether the receiver knows or does not know the carrier transmitted.

For a general overview on chaotic communication schemes, reference may be made to the following works by G. Kolumbàn et al.: "The Role of Synchronization in Digital Communications using Chaos", Part I: Fundamentals of Digital Communications, IEEE Trans., CAS-1, October 1997; Part II: Chaotic Modulation and Chaotic Synchronization, IEEE Trans. CAS-1, November 1998; Part III: Performance Bounds for Correlation Receivers, IEEE Trans. CAS-1, December 2000.

In particular, in the currently preferred embodiment, the approach according to the invention makes use of a chaotic pulse position modulation (CPPM) scheme. According to this scheme, modulation of the information is contained in the time interval elapsing between the generation of two successive pulses. The interval is determined by a chaotic digital source. Useful reference may also be made to G. M. Maggio et al., "Chaotic pulse-position modulation for ultrawide-band communication systems", by G. M. Maggio et al., Proc. UWB '99, Washington D.C., Sept. 28–30, 1999.

A signal is preferably sent to the sensor, which includes pulses generated according to a CPPM scheme of an analog type, such as the one described in "Chaos Preservation through Continuous Chaotic Pulse Position Modulation", by L. Fortuna, M. Frasca, A. Rizzo, ISCAS 2001.

The advantage of using an analog scheme, with regards to generation of the sequence of time intervals necessary for modulation, results primarily in a considerable savings. According to the traditional CPPM scheme for generating a chaotic sequence, it is required for implementing a chaotic map on a microprocessor provided with a sufficiently high number of bits. Instead, recourse to an analog or continuous CPPM scheme allows the use of circuitry with just a few operational amplifiers and a small number of other discrete components which are not costly at all.

The distance from the obstacle is evaluated by performing a correlation between the signal transmitted and the signal received, which presents only one important peak at TOF. This property is provided in multi-user scenarios with respect to correlating between two chaotic signals coming from different sources or between two different portions of the same chaotic signal. In addition, the problem linked to multipath fading is overcome, in so far as the correlation peak due to the wave reflected directly is much higher than other possible peaks due to multiple reflections of the same signal.

The present invention is therefore characterized by a low cost. The system does not require dedicated hardware and can be implemented using low-cost circuitry. In terms of performance, the system according to the invention addresses the problems that arise in multi-user scenarios with multipath fading without deteriorating the original performance of the sensor used. In terms of flexibility, the system drives a wide variety of sensors. Moreover, this is possible to do without a central control unit. Operation of the sensor is managed at a local level, and in all the applications in which a plurality of sensors are to be installed, there is no need to have a control or coordination unit.

BRIEF DESCRIPTION OF THE DRAWING

The present invention will now be described by way of a non-limiting example with reference to the attached drawings, in which:

FIGS. 5a, 5b and 6a, 6b are graphs illustrating various signals within a system according to the present invention, wherein FIGS. 5b and 6b are enlarged representations of selected portions of FIGS. 5a and 6a;

DETAILED DESCRIPTION OF THE PREFERRED EMBODIMENTS

Figure 1:
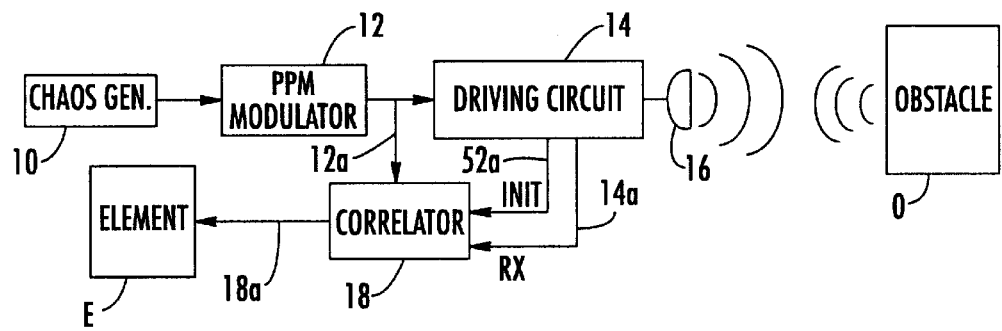
FIG. 1 is a block diagram of the general architecture of a system according to the present invention.

In the block diagram of FIG. 1, the reference number 10 designates a chaos generator, preferably an analog type, which drives a PPM modulator 12. The transmission signal (TX) thus obtained is a chaotic pulse position modulated (CPPM) signal to be supplied to a driving block 14 in such a way as to ensure proper operation of a sensor 16.

The sensor 16 may advantageously include a normal piezoelectric transducer of the type used, for instance, in burglary-alarm or anti-theft systems, such as volumetric and/or antilifting systems used in vehicle applications.

The transmission signal TX (typically comprising an ultrasound signal) generated by the sensor 16 illuminates an obstacle O. The obstacle O sends the signal that impinges upon it back to the sensor in the form of an echo. The sensor 16 detects the echo signal and generates a receiving signal (RX), that is detected by the driving unit 14. The receiving signal (RX) is sent to a correlator 18.

The correlator 18 receives both the transmission signal TX on signal path 12a and the received echo signal RX on signal path 14a. The correlator 18 performs the correlation between the signal transmitted and the echo received by the sensor 16 to obtain the time of flight (TOF) corresponding to the instant at which a function of the correlation between the transmitted signal TX and the received echo signal RX reaches a maximum value.

The reference E generically designates any circuit element that is able to exploit the signal corresponding to the TOF (and hence to the distance between the sensor 16 and the obstacle O) generated by the correlator 18 on an output path designated by reference 18a. Exploitation of the signal corresponding to the TOF is in a known way, and is based upon application of the system according to the present invention.

It will be appreciated that the present invention does not regard specifically the function or the operating modes of the element E and the circuits possibly associated therewith, which are to be considered known. As stated above, the sensor 16 preferably comprises an ultrasound sensor, such as an ultrasound sensor manufactured by Polaroid (Series 6500).

In principle, direct application of CPPM techniques to an ultrasound sensor could give rise to a number of problems, mainly linked to the mechanical inertia of the sensor. To prevent these problems, in the currently preferred embodiment of the invention, a signal is sent to the sensor 16. The signal comprises the alternation of pulse trains generated at two different frequencies within the useful band of the sensor. Switching between one modulation frequency and the other takes place at time intervals generated according to a chaotic law.

Figure 2:
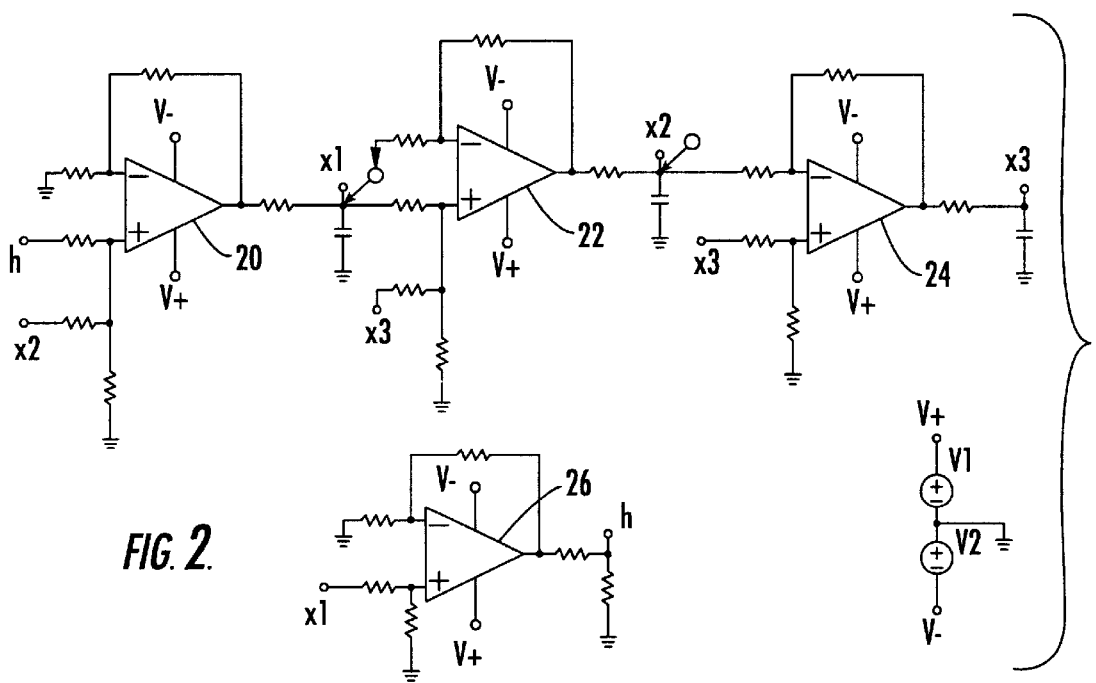
FIG. 2 is a schematic diagram of a Chua's circuit that can be used in system according to the present invention.

In a preferred way, the generation of the chaotic carrier is performed by a Chua's circuit built using operational amplifiers according to the electrical diagram shown in FIG. 2. The circuit diagram, which comprises four operational amplifiers 20, 22, 24 and 26, is illustrated in greater detail in the reference "Chua's Circuit Can Be Generated by CNN Cells", by P. Arena, S. Baglio, L. Fortuna, G. Manganaro, IEEE Trans. CAS-1, February 1995. Reference is directed to this article for a more detailed illustration of the circuit and its modes of operation.

Figure 3A:
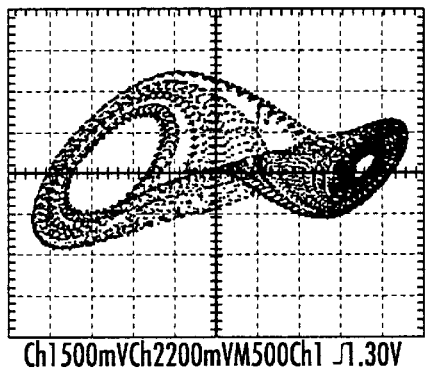
FIGS. 3a and 3b illustrate graphs of the chaotic attractor obtained using the circuit of FIG. 2, and one of the corresponding state variables that can be used as a carrier for a pulse position modulation (PPM) modulator.
Figure 3B:
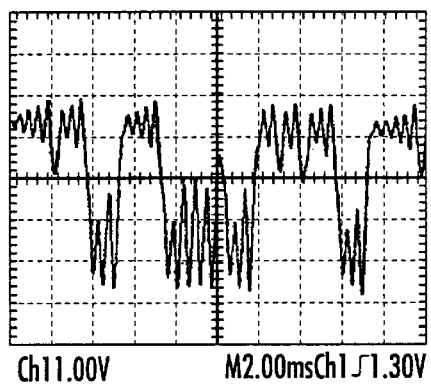

The diagram of FIG. 3 illustrates the chaotic attractor called "Chua's double scroll" that may be obtained by the circuit of FIG. 2. FIG. 3 reproduces, instead, a possible plot in time of one of the state variables ($x_1$) linked to the chaotic attractor. This state variable $x_1$ is used as a carrier for driving the PPM modulator 12.

Figure 4:
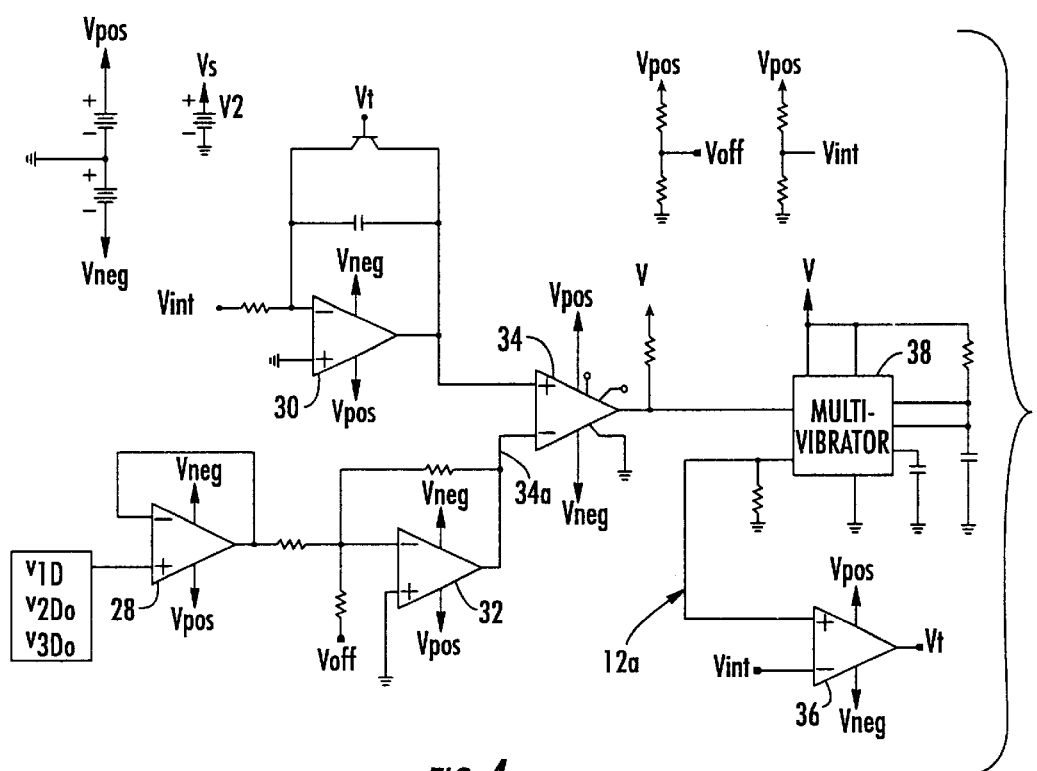
FIG. 4 is a schematic diagram of the modulator.

The PPM modulator 12 is implemented according to the general diagram represented in FIG. 4. Also in this case, the reference numbers 28 and 36 designate as many operational amplifiers connected together according to the circuit layout represented in FIG. 4. The representation is evident for a person skilled in the art, and consequently, a detailed description is not called for herein. This also applies to the block designated by 38, which includes a bistable multivibrator.

Essentially, the part of the circuit comprising the operational amplifier 30 is a saw-tooth generator that is able to generate a ramp signal with an appropriate slope, while the operational amplifier 34 is essentially configured as a threshold comparator in which the ramp signal with an appropriate slope is compared with the chaotic carrier (state variable $x_1$ of FIG. 3a) applied on an input line 34a. In this way, whenever the ramp signal reaches the level of the chaotic signal, namely the carrier, a pulse of a desired duration (which may be adjusted by acting on the multivibrator 38) is generated.

In greater detail, the diagram of FIG. 4 provides a circuit implementation in which it is possible to distinguish a block for adaptation of the level of the chaotic signal (elements 28 and 32), an integrator for generation of the ramp signal (operational amplifier 30 and circuits associated therewith), a comparator of the two signals (operational amplifier 34), and a multivibrator 38 having the function of adjusting the duration of the pulse. The circuit is built in such a way that it is possible to act easily on fundamental parameters, such as the slope of the ramp signal, the amplification and offset of the chaotic signal, and the duration of the pulse. The aim of the foregoing is to adapt the modulated signal to the physical characteristics of the ultrasound sensor 16 according to the features which will be described in greater detail below.

Figure 5A:
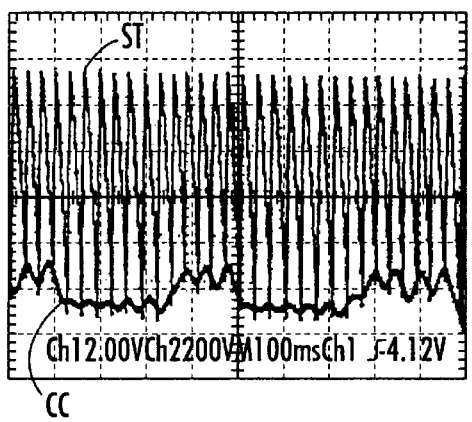
Figure 5B:
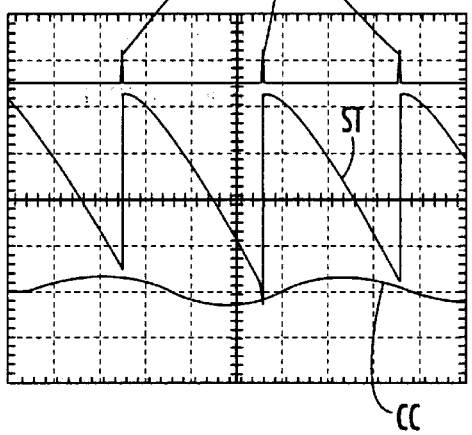

From FIGS. 5a and 5b it is possible to realize that the duration of the ramp signal (the saw-tooth signal ST in the top part of FIG. 5a) follows the pattern of the chaotic signal CC reproduced in the bottom part of FIG. 5a. This is in addition to the waveforms of the ramp signal ST and of the chaotic carrier CC, and the modulated signal CPPM which is reproduced at the top. This is clearly visible in the zoomed-in view of FIG. 5b.

Using a pulse signal, such as the signal CPPM represented in FIG. 5b for driving directly an ultrasound sensor, such as the sensor 16, is difficult due to the fact that, if the sensor is excited by a train of pulses with variable time distances, but always within its useful frequency band ($\Delta W$) on account of its mechanical inertia, the sensor does not manage to follow with the necessary promptness of the continuous frequency variations that are imposed.

For the sensor 16 to be able to vary its own oscillation frequency as a result of a variation in the excitation applied, it is thus necessary to wait a period of time within which the sensor stabilizes at the new frequency. For this reason, in the currently preferred embodiment of the invention, the general diagram of FIG. 1 is in effect implemented according to the features more clearly illustrated in FIG. 8. It will be appreciated that, in the diagram of FIG. 8, parts or elements already mentioned in the description of FIG. 1 are designated by the same reference numbers.

Basically, the function of the driving circuit 14 is to generate a signal for properly driving the ultrasound sensor 16 in such a way that the signal received will not lose the information transmitted, namely the chaotic information. The driving circuit 14 makes use of two signals (e.g., square-wave signals) at different frequencies but within the useful band $\Delta W$, and are transmitted in sequence in such a way that the duration of each of them is equal to the (chaotic) distances generated by the modulator 12.

For a proper implementation of the above approach, the choice of two parameters is significant: the location of the two frequencies within the band $\Delta W$, and the range of the time distances generated by the CPPM modulation.

The former choice is basically linked to the sensor used, and in particular, to the gain curve of the response. Consequently, it is possible to choose any frequencies falling within $\Delta W$, even though in order to render the correlation mechanism more effective, it is desirable that the two frequencies should be sufficiently distant from one another.

The two frequencies chosen, together with the mechanical characteristics of the sensor 16, determine the range of the chaotic distances that the modulator CPPM can generate. In fact, the minimum chaotic distance admissible depends upon the time required for the sensor to stabilize on the new frequency whenever a change in frequency occurs. The maximum distance is instead determined by the total duration of the signal to be transmitted for detecting the distance and upon the minimum number of samples required for the transmitted signal to be effectively recognized during the correlation stage.

With reference to the Polaroid 6500 ultrasound sensor referred to previously, the corresponding useful band $\Delta W$ ranges from 50 kHz to 60 kHz with a spatial coverage between 30 cm and 12 m, and hence with a maximum TOF of 100 milliseconds. In addition, in view of the capacitive nature of the sensor, a period of a further 100 milliseconds is required for the sensor 16 to return to a quiescent state.

Consequently, the measurements are made with a 5 Hz frequency. The operating frequencies of the sensor are thus chosen at the margins of its band, namely adopting two frequencies F1 and F2 at 50 kHz and 60 kHz, respectively. For this purpose, in the driving circuit 14 (see FIG. 8) two timer circuits 40, 42 are used which function as oscillators for generating the two frequencies F1, F2 according to the reception of the pulse train coming from the modulator 12.

Preferably, the two generators 40, 42 are configured so that at each pulse coming from the modulator 12 they are reset so as to wipe out any regularity present in the signal transmitted. Again preferably, in view of the mechanical characteristics of the sensor 16, the range of the chaotic distances is chosen between a minimum value of 160 microseconds and a maximum value of 200 microseconds. This ensures a minimum of eight oscillations for each of the frequencies F1 and F2 and a minimum of ten chaotic values, there having been imposed a duration of the transmission signal of 2 milliseconds, taking into account the characteristics of the sensor.

The reference number 44 designates a selection block or electronic switch that transfers onto its own output line 44a either one of the signals coming from the generators 40, 42 according to a switching-control signal generated by a module 46 which is sensitive to the pulses coming from the modulator 12.

At each pulse coming from the modulator 12, the module 46 acts on the switch 44 in such a way that the latter switches its operating position. In this way, at each pulse coming from the modulator 12, the frequency of the signal present on the output line 44a switches from F1 to F2 and from F2 to F1 according to an orderly alternating sequence, but with switching instants defined in a chaotic way.

Figure 6A:
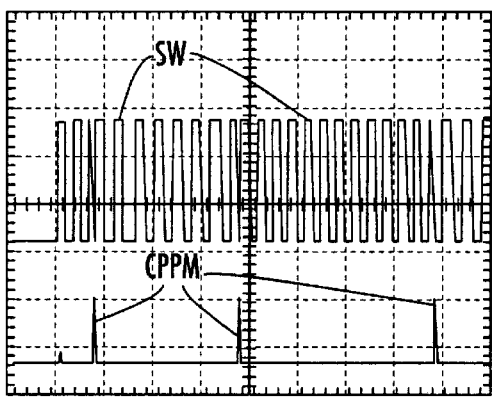
Figure 6B:
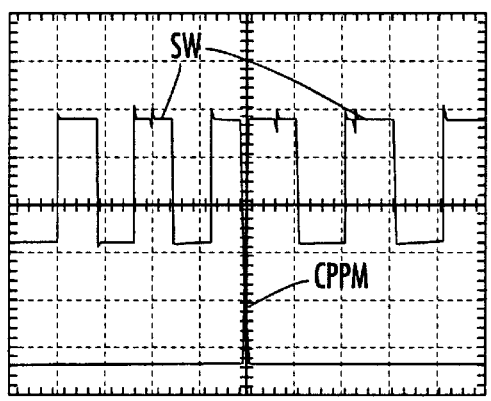

Clearly visible in FIG. 6a are, in the bottom part, the pulse signal CPPM, and in the top part, the square-wave signal SW, the frequency of which switches from F2 to F1, from F1 to F2, and then again from F2 to F1 at the instants of arrival of successive pulses of the signal CPPM. In the zoomed-in view of FIG. 6b, one of the transitions from the frequency F2 to the frequency F1 may be seen in greater detail.

Figure 8:
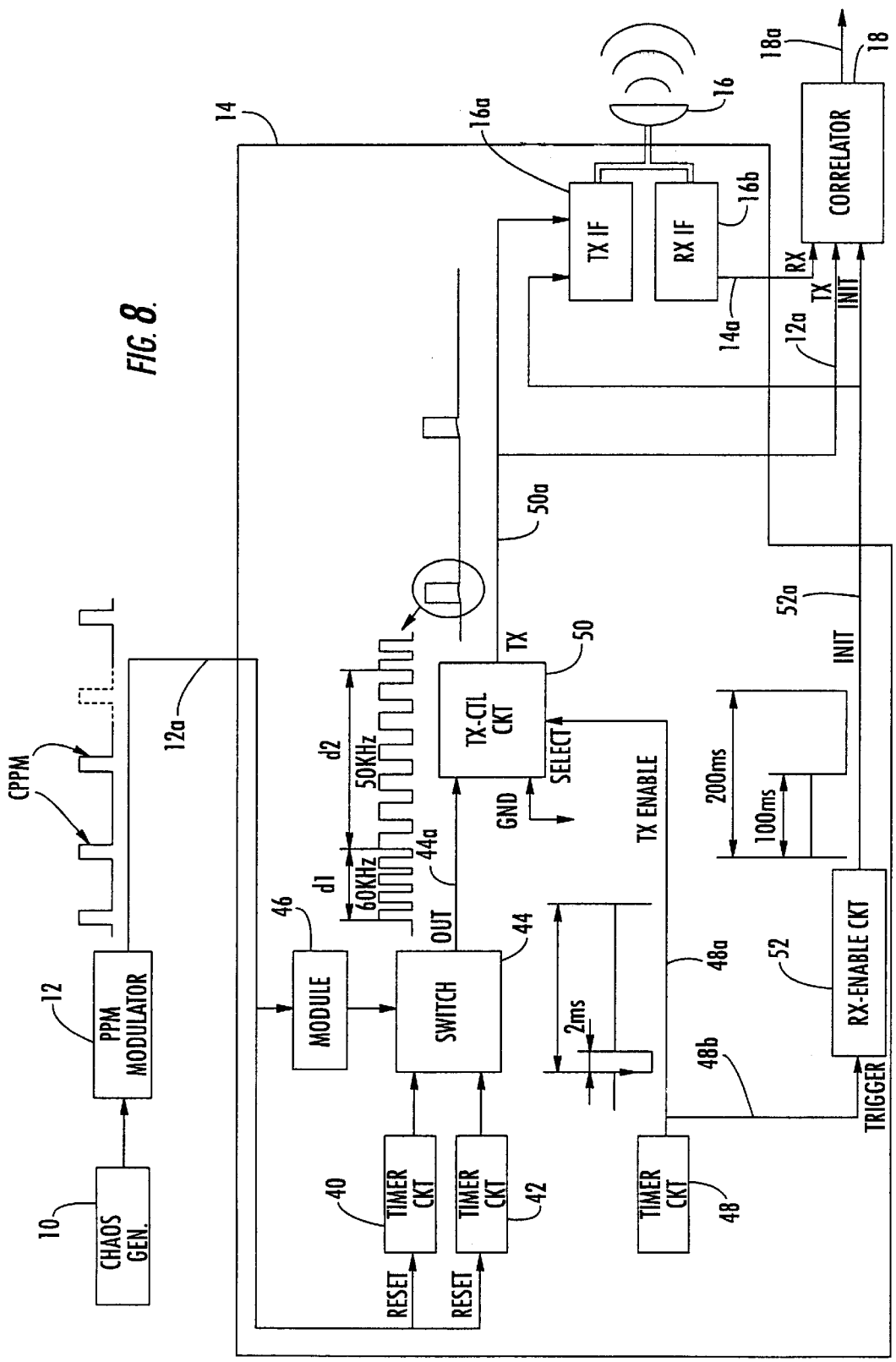
FIG. 8 is a block diagram of a driving circuit for a sensor used in a system according to the present invention.

Returning to the diagram of FIG. 8, the reference number 48 designates a third timer designed to generate both a transmission-enable signal (TXenable), which is forwarded on line 48a, and a receive-enable signal (INIT), which is forwarded on line 48b. In particular, the transmission-enable signal TXenable acts on a transmission-control circuit, designated by 50, in such a way as to cause transmission of the signal present on the line 44a (at the frequency F1 or at the frequency F2) to be enabled, for example, for 2 ms every 200 ms.

The receive-enable signal INIT is transmitted on the line 48b to a receive-enable module, designated by 52. The signal INIT is basically a square-wave signal with a 50% duty cycle. This enables reception for 100 ms and brings the sensor 16 to a quiescent state (in so far as it acts as a receiver) for the remaining 100 ms.

The reference numbers 16a and 16b designate two modules (of a known type) associated with the sensor 16, respectively with the function of a transmission-interface circuit (16a) and with the function of a receiving-interface circuit (16b). The transmitted signal TX coming out of the module 50 on a line 50a is sent to the input of the module 16a to enable the corresponding excitation of the sensor 16. The above signal is also sent, on a line corresponding to the line 12a of FIG. 1, to the correlator 18.

In a symmetrical way, the receive-enable signal INIT present on the line 52a at the output from the module 52 is sent both to the input of the module 16a (to inhibit transmission of the signal TX when the sensor 16 sets itself for listening to the echoes received, namely to the signal RX) and to the input of the correlator 18. A further input of the correlator is represented by the line 14a (see also FIG. 1), which forms the output line of the receiving module 16b.

Figure 7:
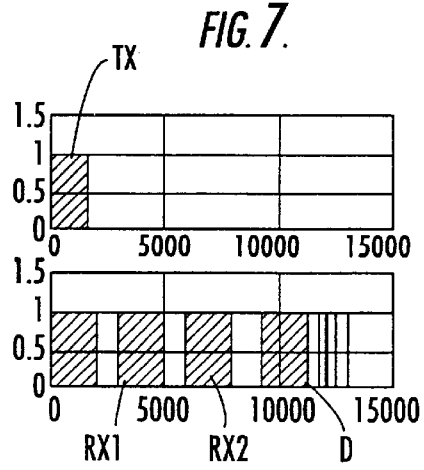
FIG. 7 is a graph of the transmission signal and a graph of the echo received in a system according to the present invention.

The representation of FIG. 7 shows that for each burst of the transmitted signal TX there corresponds a first echo RX1 (the echo to be used for the purposes of sensing), which is usually followed by at least one second echo RX2 and further disturbance signals, designated as a whole by D.

According to the invention, the possibility of recognizing the signal received by the ultrasound sensor in a unique way even in the presence of multi-user scenarios and multipath fading is based upon recognition of the strong correlation that the signal maintains with the signal transmitted.

In the approach just described, the above objective is thus achieved by using the continuous chaotic modulation (CPPM) of the signal transmitted by the ultrasound sensor. In this way, on account of its peculiarities the chaotic information contained in the signal received bestows on the signal a strong correlation with the transmitted signal, while the latter is significantly uncorrelated to any other disturbance signal.

The classic function of correlation, which is given in the equation below, goes through an integration operation which, when referred to a transmission signal TX and a receiving signal RX acquired with an appropriate sampling time $T_c$, gives rise to a correlation function $C(\tau)$ as follows:

$$C(\tau) = \Sigma_n [TX(nT_c-\tau) * RX(nT_c)]$$

Figure 9:
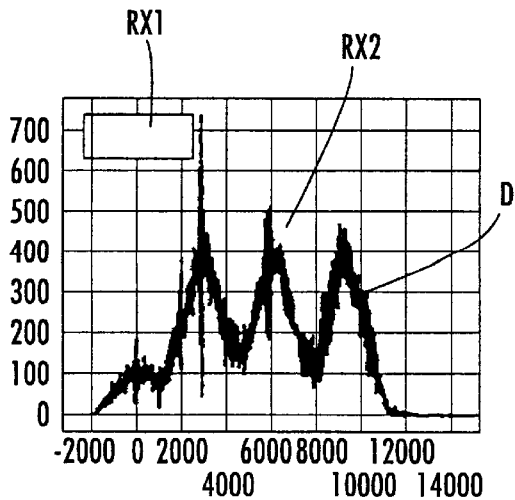
FIG. 9 is a graph illustrating a result of the correlation between the signal transmitted and the signal received in a system according to the present invention.

Since both of the signals TX and RX are of a digital type, the correlation operation is transformed into a sequence of simple logic operations. FIG. 9 presents the correlation function for a case in which a correct echo (echo I), an echo due to multipath fading (echo II), and a third signal coming from an additional ultrasound sensor (this may be, for instance, a disturbance due to crosstalk) are detected.

In FIG. 9 the presence of a high correlation peak may be noted exactly at the correct time distance. Normalizing the correlation function to unity, it may be noted that the peak due to proper reflection from the obstacle (proportional to the distance from the obstacle O) assumes a value of 0.85. This is contrast with the other two peaks due to the second echo and to the disturbance, the normalized values of which do not exceed 0.5.

Tests carried out by the present applicant have proven to be repeatable for the above result in a wide range of situations of use based upon the utilization of a number of sensors in the same environment and by the presence of different kinds of disturbance sources. Of course, without prejudice to the principle of the invention, the details of construction and the embodiments may vary widely with respect to what is described and illustrated herein, without thereby departing from the scope of the present invention.

That which is claimed is:

1. A system for detecting the distance from an obstacle, and comprising:
   at least one transducer for transmitting a transmission signal in a direction of the obstacle, and for receiving an echo signal corresponding to a reflection of the transmission signal off the obstacle;
   a chaos generator for driving said at least one transducer with a chaotic signal so that the transmission signal has characteristics of the chaotic signal;
   a pulse generator connected between said chaos generator and said at least one transducer, said pulse generator being driven according to a pulse position modulation scheme so that a time interval that elapses between generation of two consecutive pulses by said pulse generator has characteristics of the chaotic signal; and
   a driving circuit connected between said pulse generator and said at least one transducer, said driving circuit comprising a signal source for producing the transmission signal as a square-wave signal having a varying frequency with at least one first frequency and at least one second frequency, the at least one first and second frequencies being different from one another, and said signal source being driven by said pulse generator so that said signal source modifies a frequency of the transmission signal according to the chaotic signal.

2. A system according to claim 1, further comprising a correlator for correlating the transmission signal and the received echo signal so that a distance of the obstacle from said at least one transducer is identified by an instant at which the correlation assumes a predetermined value.

3. A system according to claim 2, wherein the predetermined value is a maximum value.

4. A system according to claim 1, wherein said chaos generator comprises a Chua's circuit.

5. A system according to claim 1, wherein the transmission signal is generated from a state variable of said chaos generator.

6. A system according to claim 1, wherein said pulse generator comprises an analog type pulse generator.

7. A system according to claim 1, wherein said at least one transducer has an operating bandwidth, and said signal source generates the transmission signal at frequencies within the operating bandwidth.

8. A system according to claim 7, wherein said signal source generates the transmission signal with a first transmission frequency and a second transmission frequency, the first transmission frequency and signal the second transmission frequency being located at ends of the operating bandwidth of said at least one transducer.

9. A system according to claim 1, wherein said signal source is driven by said pulse generator so that, upon emission of each pulse generated by said pulse generator, said signal source modifies the frequency of the transmission signal.

10. A system according to claim 9, wherein said signal source comprises a plurality of respective signal generators, each signal generator generating a respective signal at a given frequency, and each respective signal generator being reset by said pulse generator upon emission of each of the pulses.

11. A system according to claim 1, wherein said at least one transducer comprises a piezoelectric transducer.

12. A system according to claim 1, wherein said at least one transducer has respective transmission and receiving interfaces for simultaneous operation of both transmission and reception.

13. A system according to claim 12, further comprises an enabling/disabling circuit for inhibiting simultaneous operation of said at least one transducer.

14. A system for detecting the distance from an obstacle, and comprising:

a chaos generator for generating a chaotic signal;

a pulse generator connected to said chaos generator and being driven according to a pulse position modulation scheme so that a time interval that elapses between generation of two consecutive pulses by said pulse generator has characteristics of the chaotic signal;

a driving circuit connected to said pulse generator and comprising a signal source for producing a transmission signal that is a square-wave signal having a varying frequency with at least one first frequency and at least one second frequency, the at least one first and second frequencies being different from one another, and said signal source being driven by said pulse generator so that said signal source modifies a frequency of the transmission signal according to the chaotic signal; and at least one transducer being driven by said pulse generator for transmitting the transmission signal in a direction of the obstacle, and for receiving an echo signal corresponding to a reflection of the transmission signal off the obstacle, the transmission and received echo signals having characteristics of the chaotic signal; and a correlator for correlating the transmission signal and the received echo signal so that a distance of the obstacle from said at least one transducer is identified by an instant at which the correlation assumes a predetermined value.

15. A system according to claim 14, wherein the predetermined value is a maximum value.

16. A system according to claim 14, wherein said chaos generator comprises a Chua's circuit.

17. A system according to claim 14, wherein said pulse generator comprises an analog type pulse generator.

18. A system according to claim 14, wherein said at least one transducer has an operating bandwidth, and said signal source generates the transmission signal at frequencies within the operating bandwidth.

19. A system according to claim 14, wherein said at least one transducer has respective transmission and receiving interfaces for simultaneous operation of both transmission and reception.

20. A system according to claim 19, further comprises an enabling/disabling circuit for inhibiting simultaneous operation of said at least one transducer.

21. A method for detecting the distance from an obstacle, and comprising:

generating a transmission signal using a chaos generator so that the transmission signal has characteristics of a chaotic signal;

driving a pulse generator connected to the chaos generator according to a pulse position modulation scheme so that a time interval that elapses between generation of two consecutive pulses by the pulse generator has characteristics of the chaotic signal;

transmitting from at least one transducer connected to the pulse generator the transmission signal in a direction of the obstacle; and receiving an echo signal at the at least one transducer corresponding to a reflection of the transmission signal off the obstacle.

22. A method according to claim 21, further comprising correlating the transmission signal and the received echo signal so that a distance of the obstacle from the at least one transducer is identified by an instant at which the correlation assumes a predetermined value.

23. A method according to claim 22, wherein the predetermined value is a maximum value.

24. A method according to claim 21, wherein a driving circuit is connected between the pulse generator and the at least one transducer, and further comprising:

providing in the driving circuit a ramp signal;

comparing in the driving circuit the ramp signal with a reference signal produced by the chaos generator; and providing the pulses to the at least one transducer when a level of the ramp signal reaches a level of the reference signal.

25. A method according to claim 21, wherein a driving circuit is connected between the chaos generator and the at least one transducer, the driving circuit comprising a signal source for producing the transmission signal with at least one first frequency and at least one second frequency, the at least one first and second frequencies being different from one another, and a ramp signal source producing a ramp signal being driven by the chaos generator so that the ramp signal source modifies a frequency of the transmission signal according to the chaotic signal.

26. A method according to claim 25, wherein the ramp signal source generates the transmission signal as a square-wave signal having a varying frequency.

27. A method according to claim 25, wherein the ramp signal source is driven by the pulse generator so that, upon emission of each pulse generated by the pulse generator, the signal source modifies the frequency of the transmission signal.

28. A method according to claim 27, wherein the signal source comprises a plurality of respective signal generators, each signal generator generating a respective signal at a given frequency, and each respective signal generator being reset by the pulse generator upon emission of each of the pulses.

29. A method according to claim 21, wherein the at least one transducer has respective transmission and receiving interfaces for simultaneous operation of both transmission and reception.

30. A method according to claim 29, further comprising inhibiting simultaneous operation of the at least one transducer.

* * * * *